E. C. MEIER.
COUPLING.
APPLICATION FILED JULY 13, 1915.
1,220,254.
Patented Mar. 27, 1917.
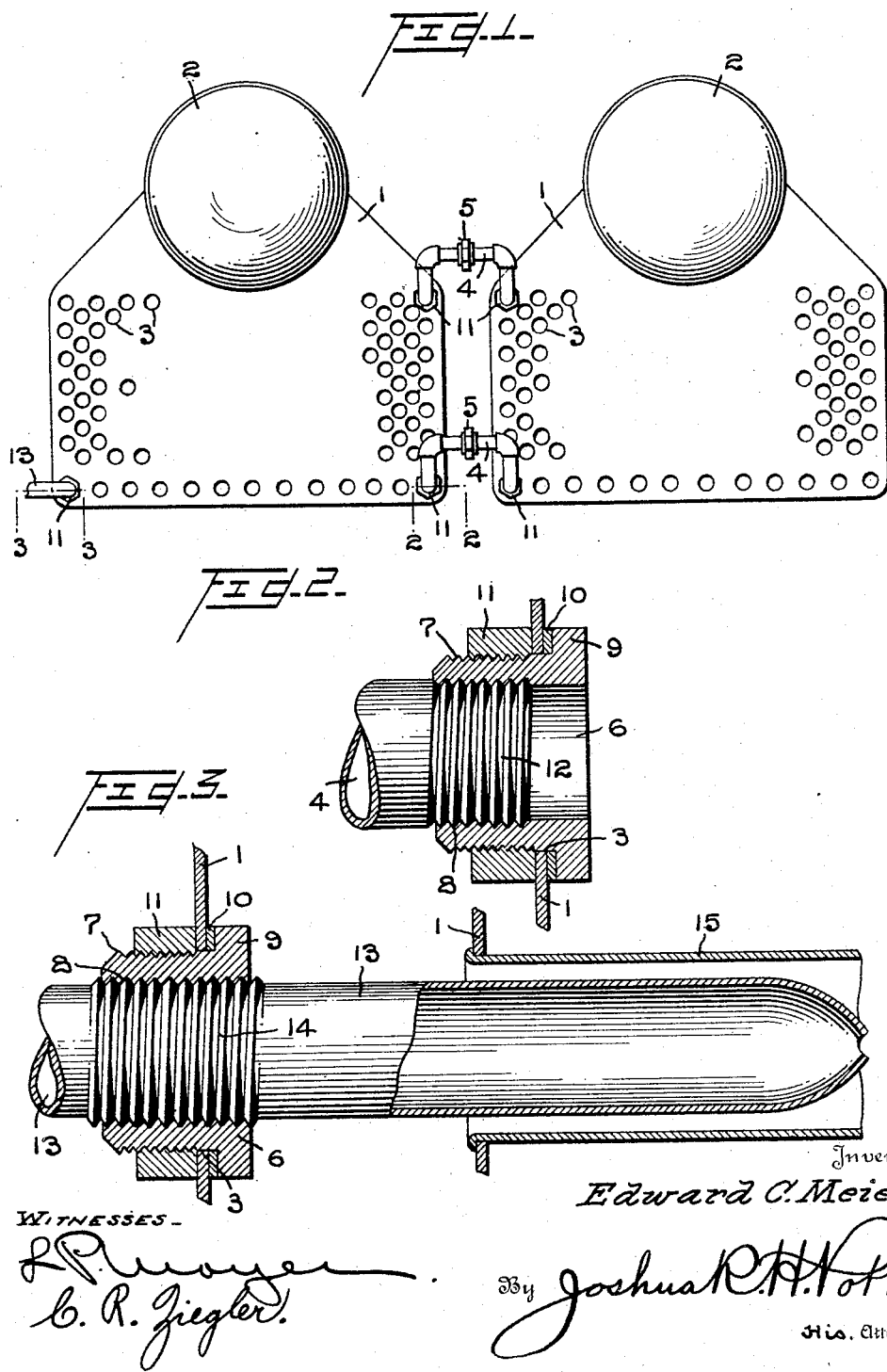
Inventor
Edward C. Meier,
By Joshua R. H. Potts.
His Attorney
WITNESSES

UNITED STATES PATENT OFFICE.

EDWARD C. MEIER, OF PHOENIXVILLE, PENNSYLVANIA.

COUPLING.

1,220,254.  Specification of Letters Patent. Patented Mar. 27, 1917.

Application filed July 13, 1915. Serial No. 39,544.

*To all whom it may concern:*

Be it known that I, EDWARD C. MEIER, a citizen of the United States, residing at Phoenixville, in the county of Chester and State of Pennsylvania, have invented certain new and useful Improvements in Couplings, of which the following is a specification.

My invention relates to improvements in couplings, and more particularly to a coupling designed for use in connection with boilers, which is especially adapted for connecting pipes with the water legs and tubes of boilers by positioning the coupling in the hand hole of the water leg plate and hence dispensing with the necessity for the reinforcing of the ordinary tapped hole or the riveting on of a flange such as is commonly done.

A further object is to provide a coupling of the character stated which is positioned through the hand hole from inside the water leg, and has an annular enlargement at its inner end bearing against the inner face of the plate and held thereagainst by pressure within the boiler, so that any possibility of leakage is reduced to a minimum.

With these and other objects in view, the invention consists in certain novel features of construction and combinations and arrangements of parts as will be more fully hereinafter described and pointed out in the claim.

In the accompanying drawings:

Figure 1 is a view in end elevation illustrating two boilers and showing my improved coupling in use as a connecting means between pipes joining the water legs of the boilers, and also as a coupling for a water inlet or supply pipe.

Fig. 2 is an enlarged view in section on the line 2—2 of Fig. 1, and

Fig. 3 is an enlarged view in section on the line 3—3 of Fig. 1, the view being partly in elevation.

1, 1, represent the water legs of adjacent boilers having drums 2 at their upper ends, and provided in their outer plates with ordinary hand holes 3. The two water legs 1, 1, are connected at two points by pipes 4. These pipes are made in sections and connected by unions 5.

The ends of the pipe sections 4 are coupled to the water legs by means of my improved couplings 6, one of which is shown on an enlarged scale in Fig. 2. The coupling 6 is tubular in form, and is externally and internally screw-threaded as shown at 7 and 8 respectively.

An annular enlargement 9 is formed integrally on the inner end of the coupling, and this enlargement is of an appreciably greater diameter than the hand hole 3 in the water leg. The body portion of the coupling is adapted to pass through the hand hole with the enlargement 9 inside the water leg, and I preferably locate a gasket 10 around the coupling between the enlargement 9 and the outer plate of the water leg 1.

A nut 11 is screwed onto the external screw threads 7, and against the plate of the water leg clamping the latter as shown clearly in Fig. 2.

The pipe sections 4, at their ends, are externally screw-threaded as shown at 12, and engage the internal threads 8 in the coupling 6.

In Fig. 3, I illustrate my improved coupling in connection with a water inlet pipe 13, and in this view it will be noted that the internal threads 8 of the coupling extend throughout the length of the coupling, while in the form shown in Fig. 2, the threads need only extend but part way through the coupling, but this of course may be varied to suit conditions.

The inlet pipe 13 is provided with external threads 14, so that it may be readily secured in the coupling, and the inner end of the inlet pipe projects into one of the water tubes 15 of the boiler as the tube is in alinement with the hand hole in the water leg.

My improved coupling is especially adapted for use in connecting several boiler units without cutting or altering the boiler structure in the slightest, as I can utilize the hand holes for the pipe junctures, and while I have illustrated my improvements in connection with the ordinary circular hand hole, it is of course to be understood that the coupling will be shaped in cross section to conform to the shape of the hand hole, and various modifications might be resorted to in this respect.

In assembling the parts the coupling will be inserted into the water leg through the ordinary man hole of the boiler, and manipulated from inside or from outside to project the same through the hand hole, and as the device is under compression rather than tension, I may utilize various metals in its construction but do not limit myself in this particular.

Various slight changes might be made in the general form and arrangement of parts described without departing from my invention, and hence I do not limit myself to the precise details set forth, but consider myself at liberty to make such changes and alterations as fairly fall within the spirit and scope of the appended claim.

Having thus described my invention, what I claim as new and desire to secure by Letters Patent is:

The combination with two water legs having hand holes in their outer plates, of couplings secured in the hand holes of the water legs, said couplings having hollow extensions externally and internally screw-threaded, said extensions also having plates of larger area than the area of the holes and at their inner ends engaging the inner surfaces of said legs, nuts on said external threads outside of said water legs for clamping the outer plates of the water legs, and pipes connecting said water legs and having ends leading therein, said pipes having external screw-threads engaging the internal screw-threads in the couplings, said pipes forming communication between two water legs, substantially as described.

In testimony whereof I have signed my name to this specification in the presence of two subscribing witnesses.

EDWARD C. MEIER.

Witnesses:
 EUGENE V. HEILMAN,
 THOS. F. BRENNAN.

Copies of this patent may be obtained for five cents each, by addressing the "Commissioner of Patents, Washington, D. C."